(12) United States Patent
Krol et al.

(10) Patent No.: US 6,370,286 B1
(45) Date of Patent: Apr. 9, 2002

(54) TUNABLE PERIODIC FILTER

(75) Inventors: Mark F. Krol; Qi Wu, both of Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/356,217

(22) Filed: Jul. 16, 1999

Related U.S. Application Data
(60) Provisional application No. 60/097,464, filed on Aug. 21, 1998.

(51) Int. Cl.[7] .................................................. G02B 6/00
(52) U.S. Cl. ........................ 385/11; 385/24; 359/484; 359/494
(58) Field of Search ............................... 385/11, 15, 24; 359/487, 488, 494–500

(56) References Cited

U.S. PATENT DOCUMENTS

| | | | | |
|---|---|---|---|---|
| 4,315,666 A | * | 2/1982 | Hicks, Jr. ..................... 385/30 |
| 4,566,761 A | * | 1/1986 | Carlsen et al. ............... 359/495 |
| 4,671,613 A | * | 6/1987 | Buhrer ......................... 359/495 |
| 4,685,773 A | * | 8/1987 | Carlsen et al. ............... 359/495 |
| 4,729,622 A | * | 3/1988 | Pavlath ........................ 385/11 |
| 4,749,259 A | * | 6/1988 | Ledebuhr ...................... 349/8 |
| 4,778,238 A | * | 10/1988 | Hicks .......................... 359/134 |
| 4,801,189 A | | 1/1989 | Herbert et al. |
| 5,689,367 A | * | 11/1997 | Pan et al. ..................... 359/495 |
| 5,982,539 A | * | 11/1999 | Shirasaki ..................... 359/484 |

FOREIGN PATENT DOCUMENTS

WO WO 9819415 5/1998

* cited by examiner

Primary Examiner—Akm E. Ullah
Assistant Examiner—Michelle R. Connelly-Cushwa
(74) Attorney, Agent, or Firm—Gregory V. Bean; William Greener

(57) ABSTRACT

A polarization-interferometry based tunable periodic filter includes polarization defining components such as polarizing beam splitters or polarizing beam displacers located on the input and output sides of a phase retarder such as a birefringent crystal. A polarization independent input consisting of multiple optical channels having a periodic frequency spacing is converted to a branched output of optical channels in which each branch has a periodic frequency spacing that is different from that of the input, and which are interleaved with each other. The output period is tunable by adjusting the phase delay of orthogonal polarization components. A contrast ratio of $\geq 20$ dB can be realized. The device allows the mux/demux of up to 200 WDM channels with a 50 GHz frequency spacing. Applications of the device include a band splitter, a wavelength selective cross-connect, and a wavelength monitor.

5 Claims, 2 Drawing Sheets

TUNABLE PERIODIC FILTER

This application claims the benefit of U.S. Provisional Application No. 60/097,464, filed: Aug. 21, 1998.

BACKGROUND OF THE INVENTION

1. Field of the Invention

The invention generally relates to a device and method for routing (e.g., dividing and subdividing) bands of optical signals and, more particularly, to a multiport, tunable periodic filter based on polarization interferometry, and a method for tuning the transmission peaks and frequency spacing of the optical signals.

2. Description of Related Art

The demand for increased data transmission capability continues to grow. Users of DWDM systems are pressing for greater bandwidth utilization with 50 GHz and tighter channel spacing, adding further challenge to upgrade existing DWDM's struggling with 100 GHz channel spacing.

Several approaches for providing building blocks for all-optical networks capable of meeting the challenging demands of service providers and users involve tunable filters. These include (but are not limited to), e.g., cascaded Fabry-Perot (resonant cavity) and Mach-Zehnder (interferometry) components for squeezing more and more channels into a free spectral range or limited bandwidth. Such devices and examples of their utilization are described in Green, *Fiber Optic NETWORKS*, Prentice Hall, cha. 4, (1993). Disadvantages associated with these devices include, e.g., long response time or slow tuning speed, poor crosstalk performance and device complexity and fabrication tolerance. Other lattice and Mach-Zehnder component filter designs used as band splitters are also described in EP 0 724 173A1, U.S. Pat. No. 5,680,490 and OFC '98 Technical Digest, paper ThQ7 by Nolan et al. These devices lack optimum contrast ratio and desired tuning capability.

The inventors have therefore recognized a need for a DWDM filter device that caters to the immediate and future requirements for high speed network systems without the disadvantages associated with current components and approaches. Accordingly, the invention describes a periodic filter device that has the attributes of accurate and easy tuning, polarization independence, high contrast ratio over the whole 1.5 $\mu$m telecommunications band, environmental stability, conformity with the ITU grid, and others, that will be apparent from the description, drawings and claims which follow. Applications of the invention include, but are not limited to, band splitters, wavelength monitors and wavelength selective cross-connect components.

SUMMARY OF THE INVENTION

Accordingly, the invention is broadly directed to a device for routing optical signals. Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

An embodiment of the invention is directed to a tunable optical channel routing device including an input for a plurality of optical channels having a frequency period; first means for separating a polarization state of the input optical channels into orthogonal (s and p) polarization states; means for temporally retarding one of the orthogonal polarization states with respect to the other orthogonal polarization state for producing an ordinary beam and an extraordinary beam for each polarization state; second means for separating the polarization states of an output from the retarding means again into orthogonal (s and p) polarization states; and, an output for the plurality of optical channels from the second means wherein each channel of a first group of output channels has a center frequency and the first group of output channels has a frequency period that is different from the frequency period of the input channels, and wherein each channel of a second group of output channels has a center frequency and the second group of output channels has a frequency period different from the frequency period of the input channels and is interleaved with the first group. The device provides a contrast ratio $\geq 20$ dB over the 1.5 $\mu$m spectral band, which is essentially limited by the dispersion of the retarding component (e.g., birefringent material).

In different aspects of this embodiment, the optical components for separating the orthogonal polarizations can be polarizing beam splitters (PBS's) or polarizing beam displacers (PBD's), and the components for providing the ordinary and extraordinary beams can be a birefringent crystal or a birefringent optical fiber. While the period of the groups of output channels is tailored by the thickness or amount of birefringent material traversed by the light, fine tuning is achieved by rotating the birefringent crystal about its c-axis, changing the length of the birefringent fiber, or through the use of a phase compensator such as a liquid crystal. An optical path length compensator such as, e.g., a half-wave plate or a selective index transparent material is used as necessary to maintain equal optical path lengths to minimize polarization mode dispersion (PMD). 1×2 and cascaded 2×2 devices according to embodiments of the invention provide further application flexibility as, e.g., optical cross-connect components.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS OF THE INVENTION

Reference will now be made in detail to the present preferred embodiments of the invention, examples of which are illustrated in the accompanying drawings and tables presented herein.

The invention deals with the filtering of optical signals and, in particular, to the splitting and combining of bands or groups of optical channels, as in a WDM; thus although the embodiments described herein will discuss the demultiplexing aspects of the invention where a band of input channels with a known frequency period or spacing is divided into, e.g., two output channel groups each of the channels of which have a center frequency and a frequency spacing equal to twice that of the input, those skilled in the art will readily appreciate that the same considerations apply to the multiplexing aspects of the invention, and that these do not need to, and will not, be described in detail for an understanding of the invention.

Figure 1:
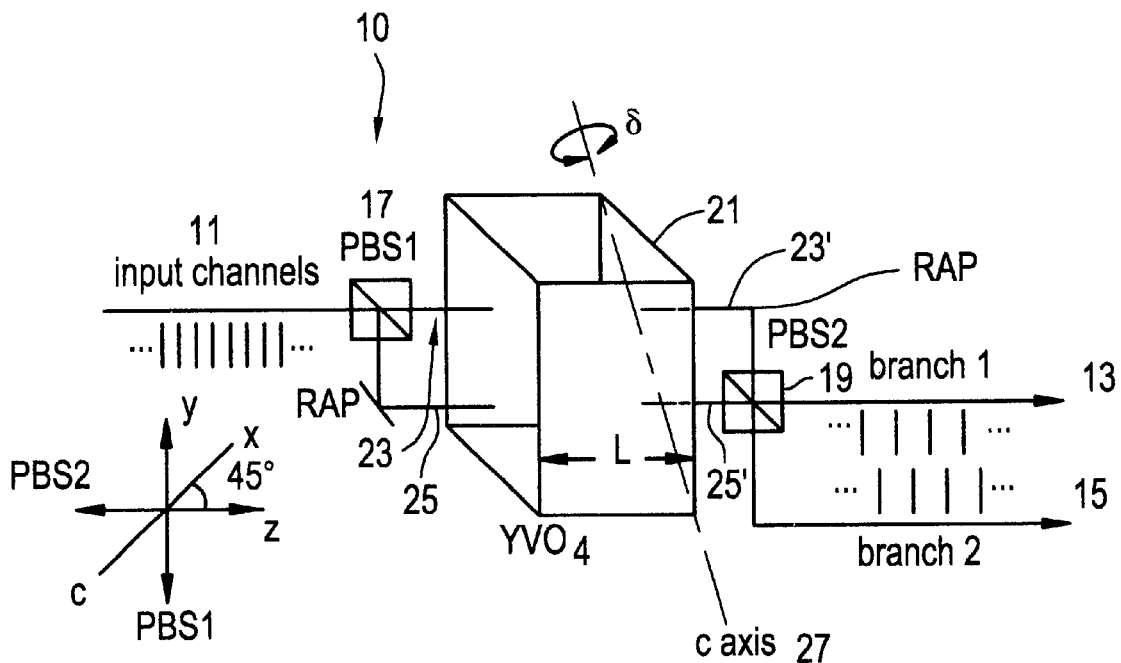
FIG. 1 schematically shows an embodiment of a polarization independent, three-port, tunable periodic filter according to an embodiment of the invention in which polarization means for separating light input into orthogonal polarization states includes two polarizing beam splitters, and phase retardation means is a birefringent crystal that is rotatable about its c-axis.
Figure 4:
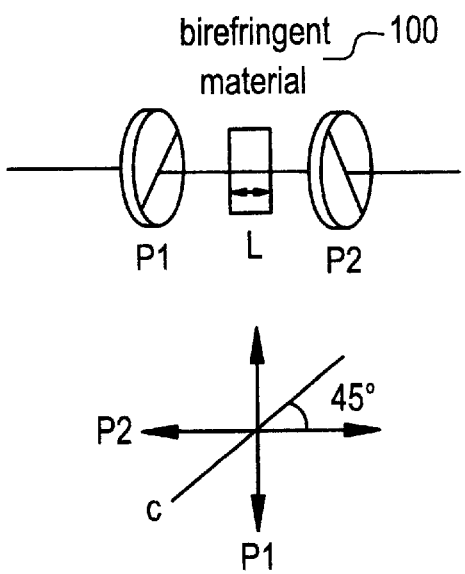
FIG. 4 is a schematic illustration of the principle of polarization interferometry using a birefringent material.

The invention is based upon the well-known principles of polarization interferometry using birefringent materials. Although the invention is operated and described for use with reference to two polarization states (s and p), the optical phenomena is described below for a single polarization state, for clarity and ease of understanding. As shown in FIG. 4, a birefringent material 100 is placed in between two orthogonal polarizers P1 and P2. If the polarization of the input light is parallel to that of P1, the system has an optical transmission coefficient, T, described by the relation:

$$T = \frac{1}{2}[1 + \cos(\phi_0 + 2\pi\upsilon\tau)], \quad (1)$$

where $\upsilon$ is the optical frequency, and $\tau$ is given by $$\tau = L/c(n_{eg} - n_{og}) \equiv L/c(\Delta n_g), \quad (2)$$

where L is the thickness of the birefringent crystal, c is the speed of light in free-space, and $\Delta n_g$ is the difference in group refractive indices between ordinary and extraordinary beams at a certain center wavelength, e.g., 1550 nm). The frequency period of the sinusoidal transmission function is thus $(1/\tau)$, which can be precisely set by tailoring L. The transmission peaks (i.e., center frequency of each output channel) can be finetuned to align them with the ITU frequency grid, through the phase constant $\phi_0$ in eq.(1). In practice, this can be achieved by slightly rotating the birefringent crystal with respect to its c-axis as shown in FIG. 1. Rotating $\delta \sim 10$ mrad, for example, will slightly change L and fine tune the transmission peaks without significant beam walk-off. Alternatively, a phase compensator such as, e.g., a liquid crystal, may be used after the first PBS 17 to dynamically control $\phi_0$ and fine tune the peak positions.

In a preferred embodiment of the invention, with reference to FIG. 1, a polarization independent, optical signal multi-channel subdivider/combiner 10 based upon a three-port periodic tunable filter having an output whose frequency period is equal to twice that of the input, includes a group of elliptically polarized (i.e., any polarization state) input signal channels 11 having a frequency period, $\frac{1}{2}\tau$, which are input to PBS 17. PBS 17 separates the input channels into orthogonal s and p polarizations 23, 25, transmitting one of them into birefringent crystal 21, and reflecting the other preferably from a right angle prism (not shown) or an equivalent device that does not affect the polarization of the light, into crystal 21. Birefringent crystal 21 has a physical thickness, L, and is preferably a material that exhibits a large birefringence; e.g., YVO$_4$ ($\Delta n_g = 0.21101$). Other materials such as, e.g., calcite and rutile, are also suitable, however, as large a birefringence as possible is preferred. As shown, birefringent crystal 21 has a c-axis orientation at 45 degrees with respect to the axes of PBS's 17 and 19 (and thus with respect to the s and p polarization states). Each of the orthogonal polarizations 23, 25 traversing birefringent crystal 21 is decomposed into an ordinary beam and an extraordinary beam having a relative time delay, $\tau$, resulting in an output that is elliptically polarized at PBS 19. PBS 19, similar to PBS 17, separates and transmits the orthogonally polarized light as a first output channel group 15, and reflects a second output channel group 13. Output channel groups 13, 15 each have a center frequency and a frequency period equal to $1/\tau$, the first group 13 being out of phase with the second group 15 by $\pi$.

In another aspect of this embodiment (not shown), two independently adjustable birefringent crystals can be used in place of sole birefringent crystal 21, to alleviate the parallelism requirement of the surfaces of a single crystal, which should be better than 0.1 mrad in order to maintain a constant phase for the two beams.

Low insertion loss devices of the type described above can be fabricated as micro-optic assemblies similar to polarization independent optical isolators which exhibit a typical insertion loss of about 0.6 dB. Before pigtailing, the devices can be further cascaded and integrated in one package to form 1×N, e.g., 1×4 or 1×8, channel subdividers. In this way the insertion loss can be kept low by reducing the amount of fiber pigtailing.

Figure 2:
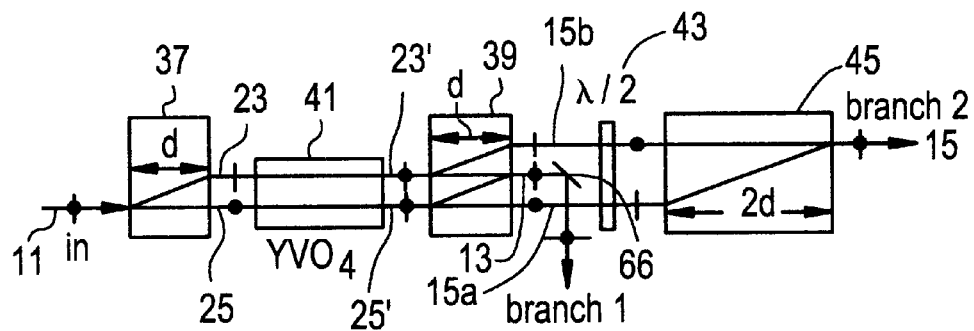
FIG. 2 schematically shows another embodiment of a polarization independent, three-port, tunable periodic filter according to the invention in which polarization means for separating light input into s and p polarization states includes two polarizing beam displacers, and further including an optical path length compensating half-wave plate.

In an alternative embodiment according to the invention, as shown in FIG. 2, the polarizing beam splitters 17, 19 of FIG. 1 are replaced by polarizing beam displacers 37, 39, each having a thickness, d. The resulting smaller beam separation (~1.5 mm) in the YVO$_4$ crystal relaxes the parallelism requirement on the crystal faces. An additional advantage of the beam displacers is their typically higher extinction ratio over PBS's. As shown in FIG. 2, an elliptically polarized input channel group 11 is input to PBD 37 which separates the beam into mutually orthogonal s and p polarizations. These enter and propagate through birefringent crystal 41 wherein each is decomposed into an ordinary beam and an extraordinary beam, and emerge as elliptically polarized light. This output then enters the second PBD 39 which separates the light signals passing through it, again into orthogonal polarizations represented by (15a, 15b) and 13, respectively. Beams 15a and 15b pass through half-wave plate 43 which rotates the polarization of each beam as a way to minimize or eliminate PMD. Orthogonally polarized beams 15a and 15b then pass through PBD 45, having a thickness equal to 2 d, for recombination into output channel group 15. Output channel group 13 is deflected by polarization maintaining means 66. Similar to that described above, output channel groups 13, 15, each have a frequency spacing that is twice as large as that of input group 11. The channel center frequencies can be fine tuned by positioning a phase retarder, such as a liquid crystal, after PBD 37. In an alternative aspect of this embodiment, the $\lambda/2$ plate could be replaced by a piece of material providing optical path length equalization (e.g., having a selective index of refraction and thickness to equalize the path lengths).

Figure 3:
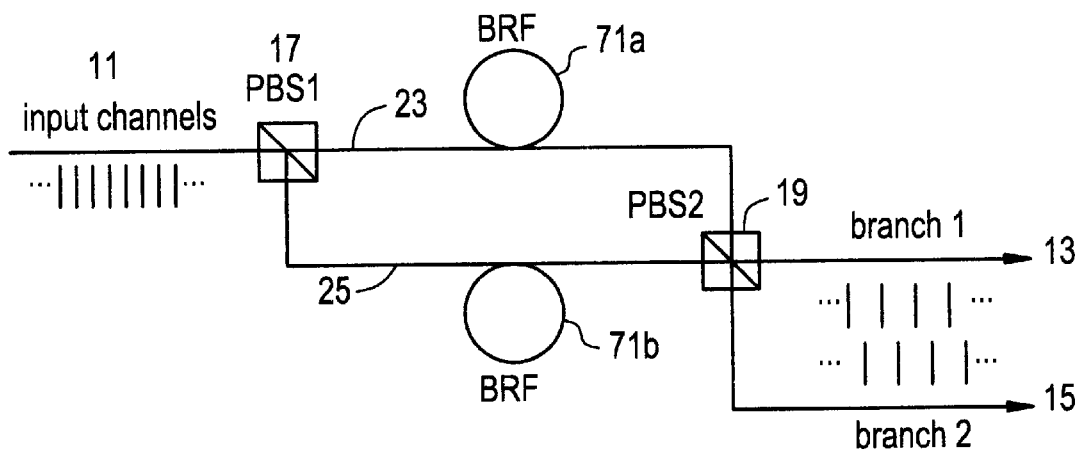
FIG. 3 schematically shows another embodiment of a polarization independent, three-port, tunable periodic filter according to the invention in which polarization means for separating input light into orthogonal polarization states includes two polarizing beam splitters, and phase compensation means are two birefringent fibers having polarization maintaining fiber pigtails.

In another embodiment, illustrated in FIG. 3, a periodic group of input channels 11 propagate to a first PBS 17 that separates and transmits either s or p-polarized light 23, and which reflects p or s-polarized light 25. The output from PBS 17 is coupled into birefringent fibers (BRF's) 71*a*, 71*b* through polarization maintaining fiber pigtails 73, and is then coupled into second PBS 19 again through polarization maintaining fiber pigtails. Second PBS 19 separates and reflects a first group of output signals 13 and transmits a second group of output signals 15; each group having a frequency spacing equal to twice that of input group 11. Typically, a BRF length of 6 m generates approximately a 10 ps time delay, τ, (i.e., a 100 GHz frequency period). The filter can be fine-tuned by stretching the BRF to change L. Although the total insertion loss may be higher (i.e., due to pigtailing to a micro-optic component), the fiber based device can be easily assembled. Ideally an all fiber PBS would reduce excess insertion loss.

In all of the preceding embodiments, the devices are inherently polarization insensitive. When the extinction ratio of the PBS's or PBD's are in the range of 30–40 dB, the contrast ratio of the embodied devices is 20 dB or more.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:

1. A tunable optical channel routing device, comprising:

an input for a plurality of optical channels having a frequency period;

a first polarization beam displacer having a thickness, d, in an optical path of the input channels for separating and transmitting an output comprising orthogonal (s and p) polarization states of the input;

a birefringent crystal in the first polarization beam displacer output optical path having a thickness L and a c-axis oriented at 45° with respect to the s and p polarization states such that the crystal propagates an output comprising at least one of an ordinary beam and an extraordinary beam;

a second polarization beam displacer having a thickness, d, in the crystal output optical path for separating and transmitting an output comprising orthogonal (s and p) polarization states of the second polarization beam displacer output, one of which is a second group of output channels;

an optical path length compensator located in an optical path of one of the s and p polarization states output from the second polarization beam displacer;

a third polarization beam displacer having a thickness, 2 d, in the second polarization beam displacer output optical path of one of the s and p polarizations for combining and transmitting a first group of output channels, wherein each channel of a first group of output channels has a center frequency and the first group of output channels has a frequency period that is different from the frequency period of the input channels, and wherein each channel of a second group of output channels has a center frequency and the second group of output channels has a frequency period different from the frequency period of the input channels and is interleaved with the first group;

further wherein the device has a contrast ratio ≧20 dB over a spectral band from about 1520 nm to 1570 nm.

2. The device of claim 1 wherein the optical path length compensator is an achromatic half-wave plate.

3. A tunable optical channel routing device, comprising:

an input for a plurality of optical channels;

a first polarization beam displacer having a thickness d positioned in an optical path of the input for separating and transmitting an output comprising orthogonal (s and p) polarization states of the input;

a birefringent crystal in optical path of the first polarization beam displacer output, the crystal positioned so as to propagate an output comprising at least one of an ordinary beam and an extraordinary beam;

a second polarization beam displacer having a thickness d positioned in the birefringent crystal output optical path for separating and transmitting an output comprising orthogonal (s and p) polarization states, one of which polarization states comprises a first group of output channels;

an optical path length compensator located in an optical path of one of the s and p polarization states output from the second polarization beam displacer; and a third polarization beam displacer having a thickness 2 d positioned in the output optical path of one of the s and p polarizations of the second polarization beam displacer so as to be able to combine and transmit a second group of output channels;

wherein the channels of the first group of output channels are interleaved with the channels of the second group of output channels and wherein the device has a contrast ratio >20 dB over a spectral band from about 1520 nm to about 1570 nm.

4. The device of claim 3 wherein the optical path length compensator is an achromatic half-wave plate.

5. The device of claim 3 wherein the birefringent crystal has a c-axis oriented at 45° with respect to the s and p polarization states of the output of the first polarization beam displacer.

* * * * *